Inventors,
Donald Mohler,
Allen N. Salomon,
by Sidney Greenberg
Their Attorney.

3,365,626
ELECTRICAL CAPACITOR
Donald Mohler, Saratoga Spa, and Allen N. Salomon, Hudson Falls, N.Y., assignors to General Electric Company, a corporation of New York
Filed Oct. 19, 1960, Ser. No. 63,548
6 Claims. (Cl. 317—230)

The present invention relates to electrical capacitors, and more particularly to the type of capacitors having anodic dielectric films formed on a base electrode.

Attempts have been made in the past to develop dry-type capacitors of the above structure to avoid the use of liquid electrolytes as in conventional electrolytic capacitors because of the problems arising from the leakage or evaporation of the liquid electrolyte from the latter capacitors, including worsening of electrical properties at temperature extremes. In general, however, the prior art dry oxide capacitors of this type have not proved practical for commercial use due mainly to the excessively high leakage currents and electrical breakdown at unduly low voltages, which characterize these capacitors. The reason for this apparently lies in the presence of sites of imperfection in the anodic dielectric oxide films which are of low electrical resistance and hence contribute to lowering of the breakdown voltage of such units, as well as resulting in undesirable leakage currents. Capacitors with liquid electrolytes are not affected to the same extent by this problem due possibly to the formation of gas bubbles which block the imperfect areas and prevent similar leakage. However, even in this case, the voltage may be sufficiently high in certain applications to cause undesirable leakage and premature breakdown.

It is an object of the invention to provide an electrical capacitor having improved electrical properties, especially in terms of leakage current and breakdown voltage. It is a particular object of the invention to provide capacitors of the type having electrodes with anodically formed dielectric films thereon, and especially dry type capacitors of this nature having high breakdown voltages and low leakage current.

Other objects and advantages will become apparent from the following description taken in conjunction with the appended claims.

To attain the above objects, the invention provides an electrical capacitor comprising a first film-forming electrode, an anodic dielectric film formed on the electrode, a non-anodic insulating film overlying the anodic dielectric film in contact therewith, and a second electrode arranged spaced from the first electrode with the dielectric and insulating films therebetween.

In accordance with the invention, the non-anodic insulating film has particular characteristics of dielectric constant, resistivity, and thickness as more fully described hereinafter.

In a particularly preferred embodiment of the invention the capacitor is a dry type having no liquid electrolyte between the electrodes and having the second electrode in the form of a layer overlying the insulating film in contact therewith.

In another embodiment of the invention, the capacitor comprises a liquid electrolyte arranged between and in contact with the second electrode and the insulating layer.

The invention will be better understood from the following description taken in conjunction with the accompanying drawing, in which.

Figure 1:
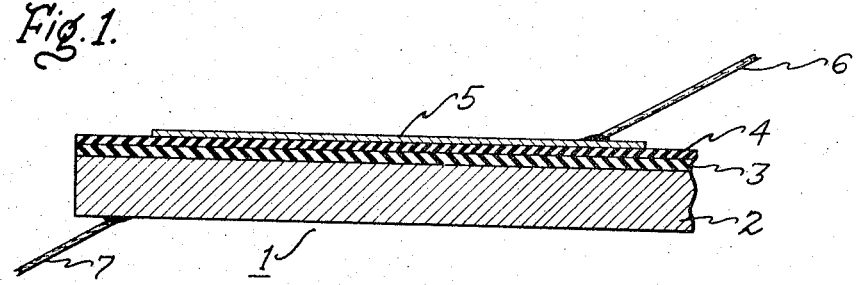
FIG. 1 shows diagrammatically in cross-sectional view a dry type capacitor embodying the present invention.

Referring now to the drawing, and especially to FIG. 1 there is shown a dry type capacitor 1 composed of a base electrode 2 made of any known or suitable film-forming metal such as aluminum, tantalum, zirconium, titanium, niobium, and alloys thereof, the base electrode 2 having thereon an anodic dielectric oxide film 3 which may be formed by any of the electrolytic anodizing processes well-known to those skilled in the capacitor art. Thus, in a typical construction, base electrode 2 may be composed of a sheet of tantalum having an anodic dielectric film 3 thereon composed of tantalum oxide. In the case where an aluminum base electrode is used, the anodic dielectric layer is of the dense type provided by conventional anodizing electrolytes such as a boric acid solution.

In accordance with the invention, an insulating or "barrier" layer 4 of particular characteristics is provided overlying dielectric film 3. Barrier layer 4 is preferably composed of a high resistivity material which has, at the same time, an adequately high dielectric constant for the purposes of the invention. Deposited over barrier layer 4 is a counter-electrode layer 5 which may be of metal or any other conductive material such as aluminum, tin, silver, copper, lead, zinc, or non-metallic solid conductive materials such as carbon. Counter-electrode 5 may be applied by any metallizing or other suitable metal depositing procedures well-known in the art. A satisfactory metal coating may be produced, for example, by vacuum evaporation of the desired metal, or by sputtering, dipping, painting, chemical deposition, spraying or the like. Conductive leads 6 and 7 are electrically connected to the respective electrodes by soldering or any other suitable means.

Figure 2:
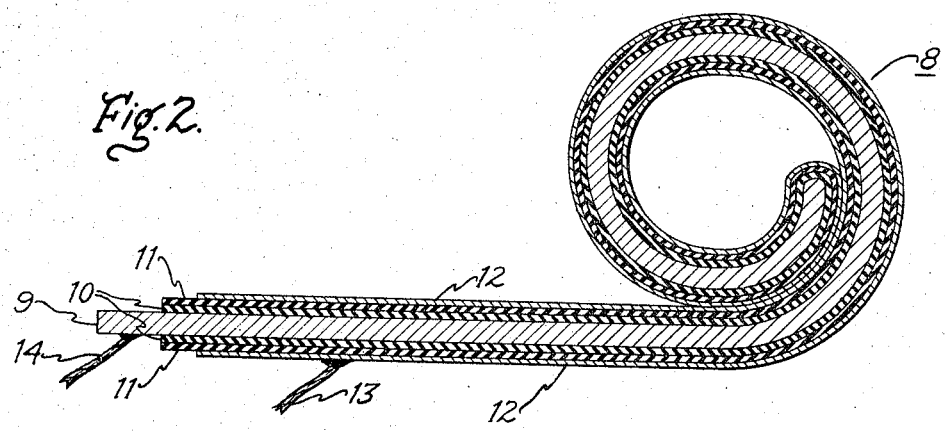
FIG. 2 shows a wound dry type capacitor formed in accordance with the invention.

FIG. 2 shows an embodiment of the invention in the form of a wound dry-type capacitor 8 comprising a rolled unitary sheet composed of a base electrode 9 of film-forming metal having superimposed on its opposite surfaces an anodically formed dielectric oxide film 10, a non-anodic insulating layer 11, and a counter-electrode layer 12 separated by layers 10 and 11 from electrode 9. Layers 10 and 11 may be formed by means already described in connection with FIG. 1. Conductive leads 13 and 14 are respectively fixed to electrodes 12 and 9. Wound unit 8, in addition to affording the advantages inherent in a dry-type capacitor, also has the desirable feature of avoiding air gaps between layers of the capacitor components which may otherwise lead to poor electrical properties in operation. Any voids entrapped in the capacitor as a result of the winding process would be present only between the contacting surfaces of electrode layer 12 and since these surfaces are at the same potential in the operation of the capacitor, no electrical stress occurs in these areas and consequently no adverse effects result from such voids. A further feature is the forming of a composite coiled counter-electrode resulting from the rolling of the metallized sheet on itself, so that the opposite metallized surfaces come into contact with one another at adjacent turns of the roll. In this way, a relatively thinner counter-electrode layer 12 may be deposited than would otherwise be required, since in the rolled condition the effective thickness of the counter-electrode layer becomes doubled. As a result, and also because the conventional paper or other insulating sheets may be eliminated, a substantially increased volumetric efficiency is realized in spite of a reduction in capacity per unit area due to the presence of the barrier layer, as mentioned below.

Figure 3:
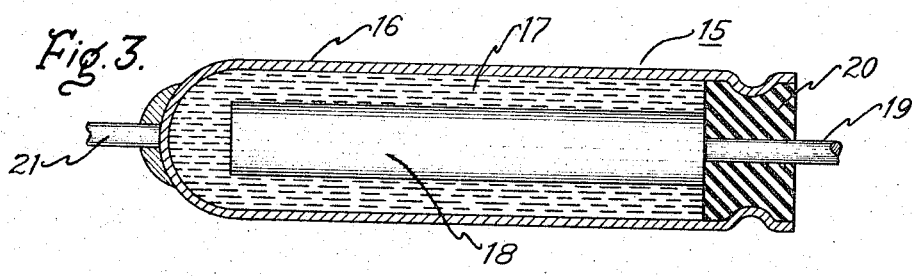
FIG. 3 shows a wet type electrolytic capacitor having a wound electrode embodying the present invention.

The invention may also find application in wet-type electrolytic capacitors, and FIG. 3 illustrates such a capacitor in which the invention may be embodied. The capacitor 15 shown in FIG. 3 comprises a casing 16 of any suitable conductive material such as silver, copper, tantalum, aluminum, lead, tin or other metallic or conductive materials, the casing serving as the cathode and containing a liquid electrolyte 17 of any suitable composition, such as an ammonium borate-glycol solution, having immersed therein a wound electrode 18. Electrode 18 is made of the structure illustrated in FIG. 2 except that the counter-electrode layer 12 and associated lead 13 are omitted. In the capacitor assembly, electrode lead 19 extends through insulating sealing plug 20 around which casing 16 is crimped or otherwise secured in fluid-tight relation. Electrode lead 21 is joined by welding or any other suitable means to casing 16 as shown. Although not necessary, a separate spacer (not shown) may additionally be provided between the electrodes as conventional in the art.

In order to achieve the intended results of the invention, insulating barrier layer 3 or 11 must have a resistivity of not less than about $10^3$ ohm-cm. A further requirement is that the dielectric constant of this layer be sufficiently high to avoid unduly reducing the capacitance of the final capacitor structure to impractical levels, and to this end the dielectric constant must not be lower than 2 and preferably should be as high as possible. The thickness of this layer should also be sufficiently great to provide effective electrical insulation, yet not be so great as to make it impractical to wind the structure if it is to be in a wound form, or to increase the volume/capacity ratio of the capacitor to undesirable levels. In general, the thickness of the barrier layer should be within the range of 25 Angstrom units to one millimeter, the particular thickness depending on the form of the capacitor and the dielectric constant and resistivity properties of the particular barrier material employed. As will be understood, the showing of the various layers in the drawing is in exaggerated scale and the relative thicknesses shown are not necessarily those used in practice.

The application of the barrier layer to the surface of the anodized base electrode may be achieved in a variety of ways, including such processes as vapor evaporation and condensation, vacuum evaporation, electrophoresis, cataphoresis, dipping, spraying, painting, pyrolysis, chemical deposition and sputtering. It has been found, however, that the provision of another oxide layer by anodic means over the first anodic oxide layer whether by the same or a different anodizing process will not provide satisfactory results for the purposes of the invention. The reason for this appears to be that anodizing processes will not produce layers sufficiently free of chemical and mechanical defects to avoid the presence of electrical leakage sites. It will be understood, therefore, that the expression "non-anodic" used herein and in the claims is intended to include any of the above-mentioned processes of applying the insulating barrier layer and to refer to insulating layers which are different from and to exclude anodically formed oxide layers.

The invention includes within its scope the provision of more than one layer of barrier material if such arrangement is desired, the plurality of layers being of the same or different non-anodic insulating materials. Their aggregate thickness, however, should be within the range above specified.

In experiments conducted in connection with the invention, three similar tantalum foils of 0.5 mil thickness were anodized in conventional manner to a voltage of 400 volts in a solution of glycolonitrile. The anodic dielectric films thus formed were composed of tantalum oxide and were about 4,000 to 6,000 Angstroms thick. On two of the samples, identified as Samples A and B below, silicon monoxide was vapor deposited in well-known manner to form a film on the anodic layer, the silicon monoxide film having a thickness of the order of the anodic film, i.e., about several thousand Angstrom units. The third foil sample, Sample C, was not so treated, and served as a control. Each of the three samples was then provided with an aluminum counter-electrode about 20,000 Angstrom units thick by vapor deposition, so that Samples A and B had the aluminum electrode layer overlying and in intimate contact with the silicon monoxide barrier layer, while in Sample C, the aluminum electrode layer was in contact with the tantalum oxide anodic film. Capacitance and dissipation factor were measured at 120 cycles per second between the tantalum and aluminum electrodes, and direct current voltage applied between the electrodes was slowly raised until permanent failure occurred for each sample. The results shown in Table I below were obtained:

TABLE I

| Sample | Capacitance, µf. | Percent DF | Maximum DC Breakdown, volts | Percent Capacitance of Control |
|---|---|---|---|---|
| A | .277 | 2.0 | 400+ | 46 |
| B | .345 | 2.5 | 210 | 57 |
| C | .605 | | <33 | 100 |

The above data show that while a reduction in capacitance of about 50% resulted from the provision of a barrier layer of silicon monoxide, the breakdown voltage achieved was 6 to 12 times greater than that of the control samples.

Similar experiments were performed on samples wherein the base electrode was aluminum having an anodic aluminum oxide film thereon but otherwise of the same construction as the previously described samples. Results of these experiments were as follows, Sample D being that containing the silicon monoxide layer and Sample E being the control without such a layer:

TABLE II

| Sample | Capacitance, µf. | Percent DF | Maximum DC Breakdown, volts | Percent Capacitance of Control |
|---|---|---|---|---|
| D | .0221 | 4.5 | 447 | 61 |
| E | .0360 | 1.0 | 95 | 100 |

As will be seen, the improvement in the D.C. voltage breakdown was over four-fold due to the use of an intermediate barrier layer of silicon monoxide overlying the anodic aluminum oxide film.

In further experiments using samples such as those last-described, it was found that the A.C. breakdown voltage was also markedly increased by the use of a silicon monoxide barrier layer, the improvement in this case being about two-fold while about 63% of the capacitance was retained.

Further experiments of similar nature were conducted on a number of samples having a calcium silicate barrier layer deposited on an anodized tantalum electrode and with an aluminum counter electrode deposited on the barrier layer. The results obtained in this case using the same test conditions are as follows, the values for Sample F representing an average of values for the barrier layer capacitors and for Sample G an average for the control capacitors which had no barrier layer:

TABLE III

| Sample | Capacitance, µf. | Percent DF | Maximum DC Breakdown, volts | Percent Capacitance of Control |
|---|---|---|---|---|
| F | .0615 | 3¾ | 440 | 98 |
| G | .0626 | ¾ | 63 | 100 |

In the above case, it is particularly noteworthy that the capacitance drop in the barrier layer capacitors was insignificant, while the D.C. breakdown voltage increased seven-fold.

A.C. breakdown tests on similar capacitors with a calcium silicate barrier layer showed a three-fold improvement in A.C. voltage breakdown with 97% capacitance retained.

In tests made on similar samples of anodized tantalum electrodes and with aluminum counter electrodes as last-described, except that a film of zinc sulfide 10 millionths inch thick was used as the barrier layer instead of calcium silicate, the following results were obtained, Sample H being the zinc sulfide capacitors, and Sample I being the control capacitors:

TABLE IV

| Sample | Capacitance, μf. | Percent DF | Maximum DC Breakdown, volts | Percent Capacitance of Control |
|--------|------------------|------------|------------------------------|-------------------------------|
| H      | .0334            | 1¼         | 345                          | 53                            |
| I      | .0633            |            | 73                           | 100                           |

Here, also, the marked improvement in the breakdown voltage by the use of an insulating barrier layer was manifest.

It is further evident from the foregoing data that the capacitors of this invention are well-adapted for use in A.C. and non-polar applications.

While in general the capacitors incorporating a barrier layer in accordance with the invention suffer a drop in capacitance, this is more than offset by the remarkable increase achieved in the breakdown voltage. Such improvement in the latter characteristic now makes practical the use of dry type anodic film capacitors which heretofore had such poor breakdown properties as compared to the liquid electrolytic types that they could not be usefully employed except for very restricted applications. The invention is of particular advantage in its application to energy storage capacitors, since the stored energy which varies as the square of the voltage in accordance with the product $CV^2$ is markedly increased despite the drop in capacitance noted. Thus, considering, for example, the data for Sample A above wherein a drop of capacitance of 46% was suffered, the stored energy obtainable by this sample as compared to the control Sample C is calculated as:

$$\frac{CV^2}{CV^2} = \frac{.277(400)^2}{.605(33)^2} = 67.1$$

showing an improvement in stored energy of 67 times by the provision of a barrier layer of silicon monoxide for the anodized tantalum electrode in a dry-type capacitor.

While the particular barrier layer materials mentioned above have proved satisfactory for the purposes of the invention, it is not intended to limit the invention thereto. Other insulating materials, both inorganic and organic, having the required properties mentioned above may be employed, including in general oxides, silicates, phosphates, halides, titanates, arsenates, sulfur compounds, and other materials. For example, silicon dioxide, titanium dioxide, the titanates of magnesium, calcium, strontium and barium, glass, and glass bonded mica may be employed, each of these materials being known to have a resistivity of at least $10^{10}$ ohm-cm., and a dielectric constant of at least 4. In addition, organic materials such as synthetic and natural resins, paraffins, and the like may be employed, as for example, polystyrenes, polyacrylates, polymeric fluoro hydrocarbons, etc.

While the use of a barrier layer for the anodized electrode has particular advantages for use in a dry type capacitor for the reasons mentioned above, the invention can be advantageously used even in a liquid electrolyte capacitor as described. In its application to such liquid electrolyte capacitors, even higher voltage applications can be appropriate for such capacitors because of the high dielectric strength imparted to these capacitors, and also the lower leakage currents made possible.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising a first electrode composed of a film-forming metal, an anodic non-porous dielectric film formed on said first electrode, an electrically insulating non-anodic silicon oxide layer having a resistivity of at least $10^3$ ohm-cm. and a dielectric constant of at least 2 overlying said anodic dielectric film in intimate contact therewith, and a second electrode composed of a conductive material overlying said insulating non-anodic layer in contact therewith and spaced by said insulating non-anodic layer and said anodic film from said first electrode.

2. An electrical capacitor comprising a convolutely wound roll comprising a sheet formed of a foil of film-forming metal constituting a first electrode and having an anodic non-porous dielectric oxide film formed on opposite surfaces thereof, a non-anodic silicon oxide insulating layer having a resistivity of at least $10^3$ ohm-cm. and a dielectric constant of at least 2 overlying said anodic dielectric oxide film in intimate contact therewith, and a layer of conductive material constituting a second electrode overlying said insulating layer in direct contact therewith and spaced by said anodic film and said non-anodic insulating layer from said first electrode, the conductive electrode material on opposite surfaces being in contact in adjacent turns of the wound roll so as to form a composite coiled electrode.

3. An electrical capacitor comprising a first electrode composed of a film-forming metal, an anodic non-porous dielectric film formed on said first electrode, an electrically insulating non-anodic layer composed of a material selected from the group consisting of silicon monoxide, calcium silicate, and zinc sulfide, said insulating non-anodic layer overlying said anodic dielectric film in intimate contact therewith, and a second electrode spaced from said first electrode with said insulating non-anodic layer and said anodic film therebetween.

4. An electrical capacitor comprising a convolutely wound roll comprising a sheet formed of a foil of film-forming metal constituting a first electrode and having an anodic non-porous dielectric oxide film formed on opposite surfaces thereof, a non-anodic silicon oxide insulating layer about 25 Angstrom units to 1 millimeter thick having a resistivity of at least $10^3$ ohm-cm. and a dielectric constant of at least 2 overlying said anodic dielectric oxide film in intimate contact therewith, and a layer of conductive material constituting a second electrode overlying said insulating layer in contact therewith and spaced by said anodic film and said non-anodic insulating layer from said first electrode, the conductive electrode material on opposite surfaces being in contact in adjacent turns of the wound roll so as to form a composite coiled electrode.

5. An electrical capacitor comprising a first electrode composed of a film-forming metal, an anodic dielectric film formed on said first electrode, an electrically insulating non-anodic layer overlying said anodic dielectric film in intimate contact therewith and composed of a material selected from the group consisting of silicon monoxide, calcium silicate and zinc sulfide and having a resistivity of at least $10^3$ ohm-cm. and a dielectric constant of at least 2, a second electrode spaced from said first electrode with said insulating non-anodic layer and said anodic film therebetween, and a liquid electrolyte disposed between and in contact with said insulating non-anodic layer and said second electrode.

6. A capacitor comprising in combination a base metal foil, an oxide film formed on the surface of said foil, a film of mechanically and thermally tenacious dielectric selected from the group consisting of silicon oxide on said oxide film, and a metallic film on said dielectric film.

References Cited

UNITED STATES PATENTS

| | | | |
|---|---|---|---|
| 1,877,140 | 9/1932 | Lilienfeld | 317—231 |
| 1,906,691 | 5/1933 | Lilienfeld | 317—230 |
| 2,005,279 | 6/1935 | Van Geal | 317—230 |
| 1,900,018 | 4/1933 | Lilienfeld | 317—230 |
| 3,065,393 | 11/1962 | Okamoto et al. | 317—242 |
| 3,079,537 | 2/1963 | Sato et al. | 317—258 |
| 2,734,478 | 2/1956 | Reynolds et al. | 317—258 |
| 2,448,513 | 9/1948 | Brennan et al. | 317—258 |
| 2,826,724 | 3/1958 | Lilienfeld | 317—230 |
| 3,113,253 | 12/1963 | Ishikawa | 317—258 |
| 2,504,178 | 4/1950 | Burnham | 317—242 |
| 2,593,829 | 4/1952 | Arledter et al. | 317—260 |

OTHER REFERENCES

Kass, S., "On Tantalum Capacitors," in "Semiconductor Products," May/June 1958, pp. 38–40.

LARAMIE E. ASKIN, *Primary Examiner.*

S. BERNSTEIN, J. P. WILDMAN, J. H. BURNS,
*Examiners.*

J. D. KALLAM, W. F. ZAGURSKI, E. GOLDBERG,
*Assistant Examiners.*